(12) United States Patent
Nordland et al.

(10) Patent No.: US 6,546,685 B2
(45) Date of Patent: Apr. 15, 2003

(54) BRACKET FOR USE IN SECURING COLLECTOR FLIGHT SUPPORT TRACKS IN A WASTEWATER TREATMENT TANK

(75) Inventors: Jeffery L. Nordland, Waukesha, WI (US); Susan M. Rasmussen, Helenville, WI (US)

(73) Assignee: United States Filter Corporation, Palm Desert, CA (US)

( * ) Notice: Subject to any disclaimer, the term of this patent is extended or adjusted under 35 U.S.C. 154(b) by 81 days.

(21) Appl. No.: 09/753,938

(22) Filed: Jan. 3, 2001

(65) Prior Publication Data

US 2002/0083677 A1 Jul. 4, 2002

(51) Int. Cl.$^7$ .......................... E02D 27/42; E02D 27/32
(52) U.S. Cl. .............. 52/298; 52/296; 52/297
(58) Field of Search .................. 52/736.1, 745.17, 52/737.1, 737.2, 296, 297, 298; 248/519; 210/249

(56) References Cited

U.S. PATENT DOCUMENTS

| | | |
|---|---|---|
| 2,067,277 A | 1/1937 | Miick |
| 2,102,990 A | 12/1937 | Briggs |
| 2,160,534 A | 5/1939 | Briggs |
| 2,160,535 A | 5/1939 | Briggs |
| 2,220,959 A | 11/1940 | Jennings |
| 2,393,725 A | 1/1946 | Walker |
| 3,018,077 A | 1/1962 | Buehler |
| 3,313,422 A | 4/1967 | Swenson |
| 4,645,598 A | 2/1987 | Hannum |
| 5,468,391 A | 11/1995 | Wilcher |
| 5,788,837 A | 8/1998 | Hannum |
| 5,992,644 A | 11/1999 | Hannum |
| 6,019,216 A | 2/2000 | Patterson |

OTHER PUBLICATIONS

FMC Corporation; Material Handling Systems Division; J–Track Non–Metallic Return Track; Aug. 1997; USA.
FMC Corporation; J–Track Non–Metallic Return Track; Improved Performance for your Straighline Rectangular Sludge Collector.
Polychem Corporation; Polychem Engineered Non–metallic NCS–720–S Chain; Cast Nylon Sprockets & Corrosion Resistant Systems & Components; Jun. 1995.
Polychem Corporation; Non–Metallic Systems and Components for: Rectangular Clarifiers, Bucket Grit Conveyors, DAF and API Separators, Grit Classifiers; Feb. 5, 1998.

*Primary Examiner*—Carl D. Friedman
*Assistant Examiner*—Kevin McDermott
(74) *Attorney, Agent, or Firm*—Michael Best & Friedrich LLP

(57) ABSTRACT

The present invention relates to a bracket for securing collector flight support tracks that are used in sludge collectors. The mounting bracket is suitable for use with various types of support track configurations. The mounting bracket is part of an assembly that is adjustable and includes a pair of unitary molded hubs and a connecting member that extends between the pair of hubs. The hubs are preferably constructed so as to facilitate being mounted in one of a number of alternative positions on a wall of a collector tank or to be secured to a variety of commonly used collector flight support tracks.

25 Claims, 5 Drawing Sheets

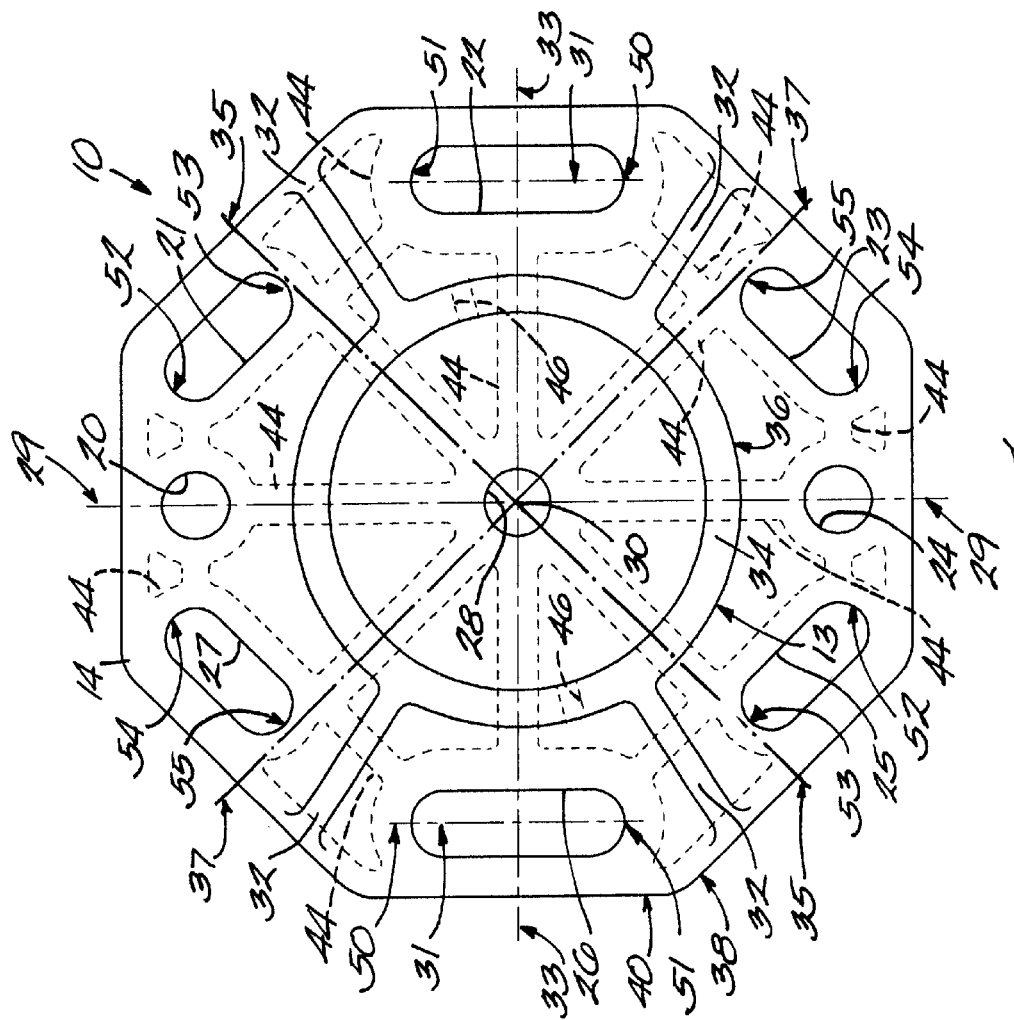
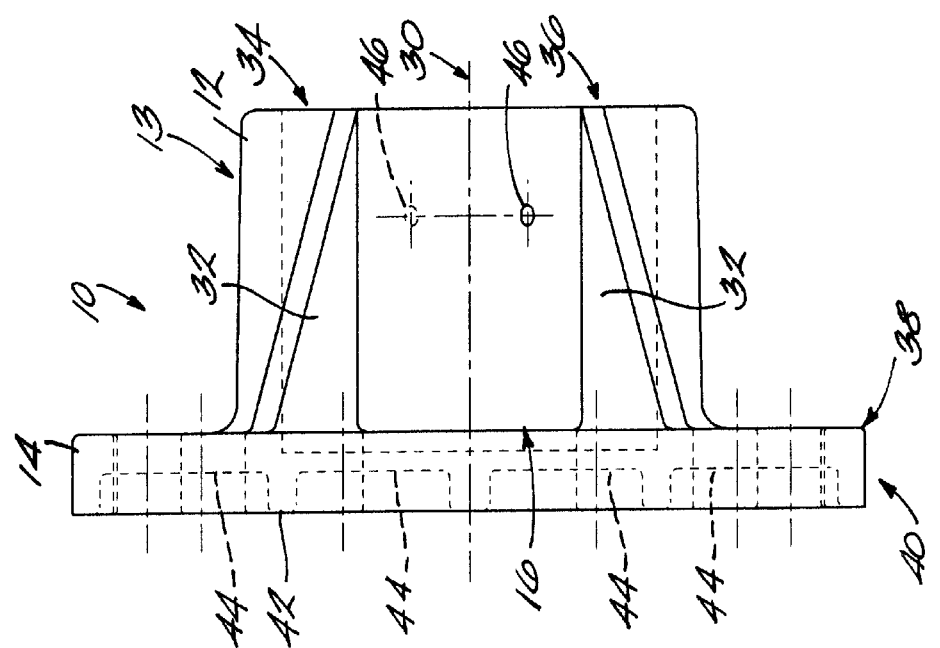
Fig. 2
Fig. 1

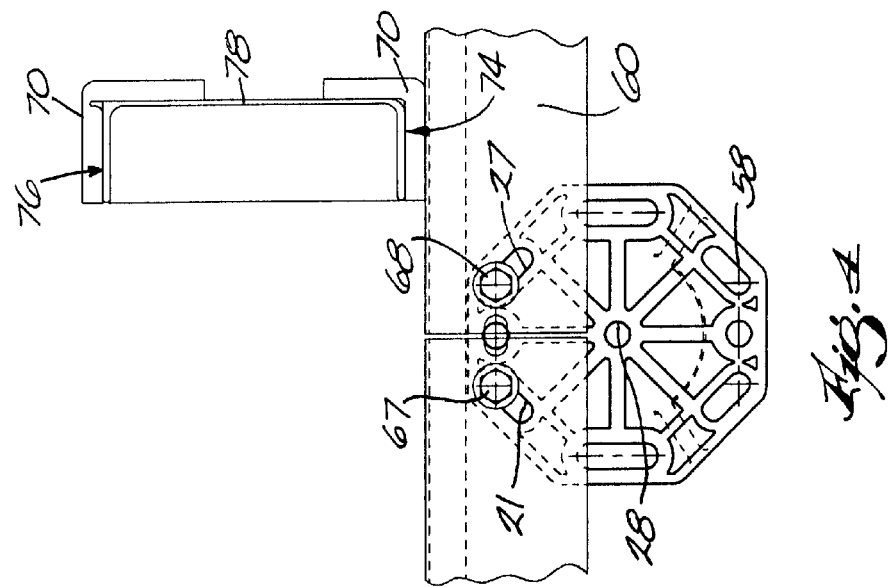
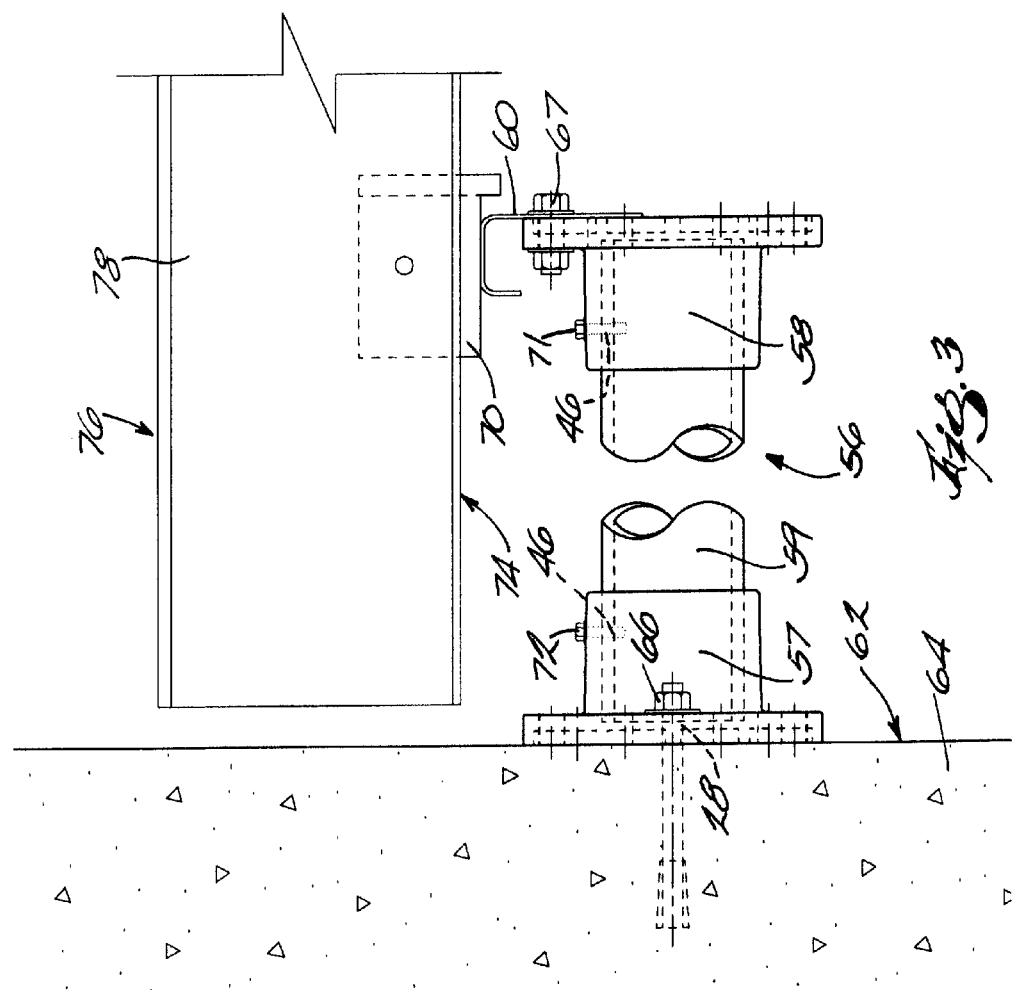

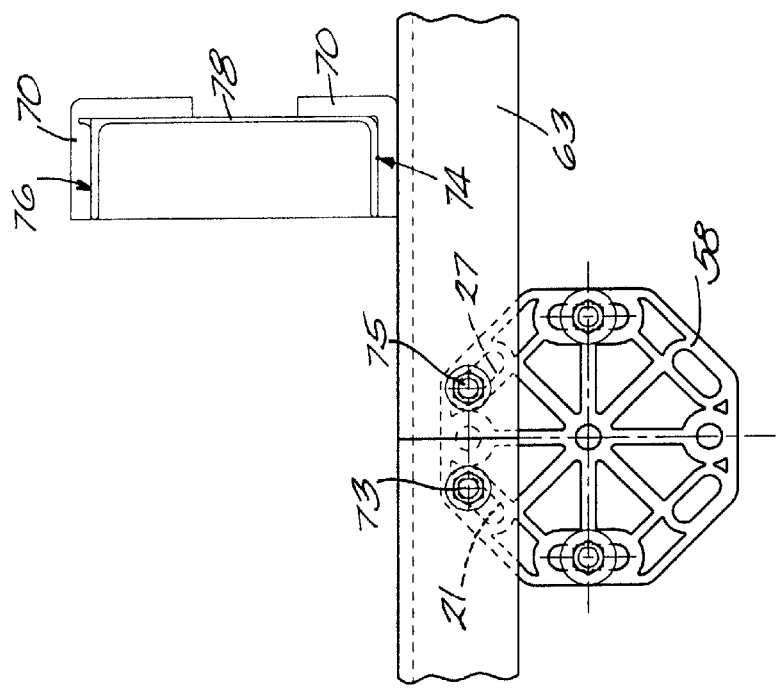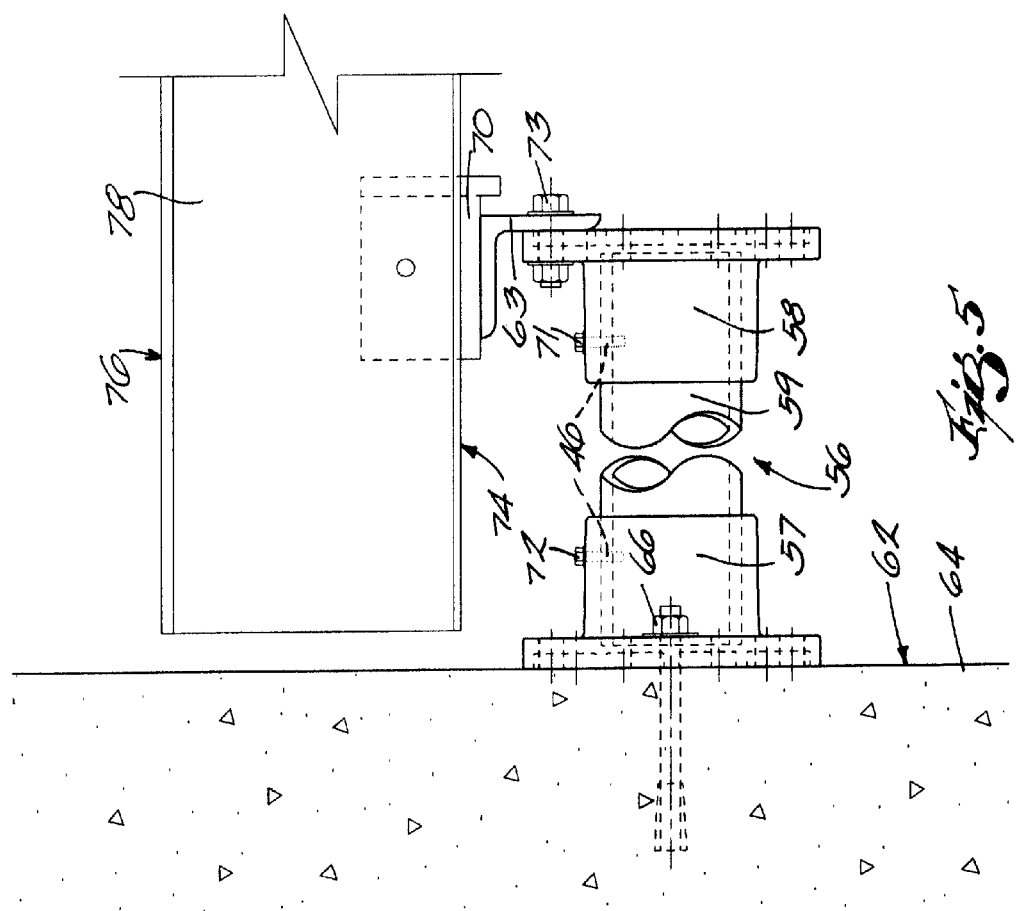

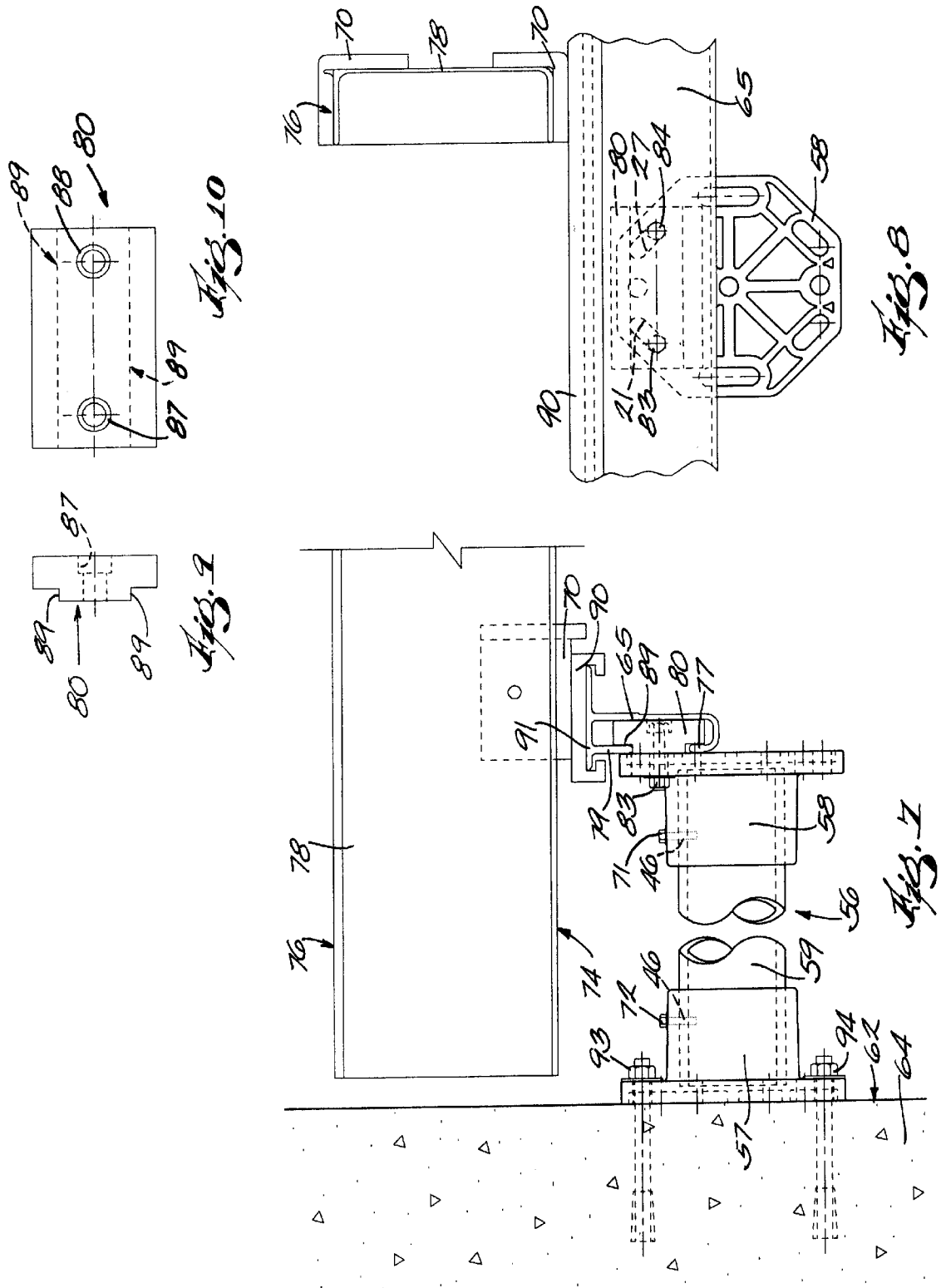

BRACKET FOR USE IN SECURING COLLECTOR FLIGHT SUPPORT TRACKS IN A WASTEWATER TREATMENT TANK

FIELD OF THE INVENTION

The invention relates to a sludge collector for treating wastewater, and more particularly to a bracket assembly for use in securing a collector flight supporting track within a sludge collector.

BACKGROUND OF THE INVENTION

Sludge collectors are commonly used in wastewater treatment plants to scrape settled sludge from the bottom of a settling tank and to skim floating waste off the surface of the wastewater. The sludge collector tanks are typically made of concrete and include a number of flights which are usually elongated members that extend across the width of the tank. The flights are typically made from pultruded fiberglass that is formed in various channel-shaped profiles. The flights are connected at opposing ends to conveyor chains which carry the flights in a circuit along the bottom of the tank to perform the scraping operation and over the surface of the wastewater to perform the skimming operation.

As the flights move along the bottom of the tank, the flights are supported by tracks extending along the tank bottom. As the flights move along the surface of the tank, the opposing ends of the flights are supported by tracks mounted on the side walls of the tank. The portions of the flights which engage the track at the bottom and side walls of the tank are subject to wear such that low friction wear shoes are attached to the flights at each point where the flights contact the support tracks.

The support tracks are secured to the walls of the treatment tanks by brackets that are typically useable with only a single-track configuration. Since there are several different types of support tracks that are commonly used to support collector flights within treatment tanks, manufacturers are required to produce numerous different brackets resulting in increased production costs. Although the assortment of prior art brackets adequately support the many different types of track, it would be desirable to have a single bracket that works with numerous different track configurations.

The lateral position of prior art supporting bracket assemblies is fixed relative to the walls of the treatment tank once the brackets are secured to the walls. The fixed lateral position makes it difficult for prior art brackets to support collector flights of varying length. Therefore, it would be desirable if the bracket assemblies which support the collector flights were adjustable so the bracket assemblies could be modified depending on the application.

SUMMARY OF THE INVENTION

The present invention relates to a bracket for securing collector flight support tracks that are used in sludge collectors. The mounting bracket is suitable for use with a variety of support track configurations.

The mounting bracket is part of an assembly that includes a pair of molded hubs and a connecting member that extends between the pair of hubs. The hubs are preferably constructed so as to facilitate mounting one of the hubs in a number of alternative positions on a wall of a collector tank while the other hub is configured to be secured to a variety of different types of commonly used collector flight supporting tracks. The hubs are preferably identical to one another, and the connecting member is adjustable in order to permit the bracket assembly to be used with collector flights having their return wear shoes mounted at different distances from the tank walls.

Other features and advantages of the invention will become apparent to those of ordinary skill in the art upon review of the following detailed description, claims, and drawings.

BRIEF DESCRIPTION OF THE DRAWINGS

FIG. 1 is a side view illustrating a mounting bracket of the present invention.

FIG. 2 is an end view of the mounting bracket illustrated in FIG. 1.

FIG. 3 is a side view of a bracket assembly of the present invention supporting a first type of collector flight supporting track.

FIG. 4 is an end view of the bracket assembly illustrated in FIG. 3.

FIG. 5 is a side view of a bracket assembly of the present invention supporting a second type of collector flight supporting track.

FIG. 6 is an end view of the bracket assembly illustrated in FIG. 5.

FIG. 7 is a side view of a bracket assembly of the present invention supporting a third type of collector flight supporting track.

FIG. 8 is an end view of the bracket assembly illustrated in FIG. 7.

FIG. 9 is an end view of an insert that is used with the bracket assembly illustrated in FIG. 7.

FIG. 10 is a front view of the insert shown in FIG. 9.

Figure 11:
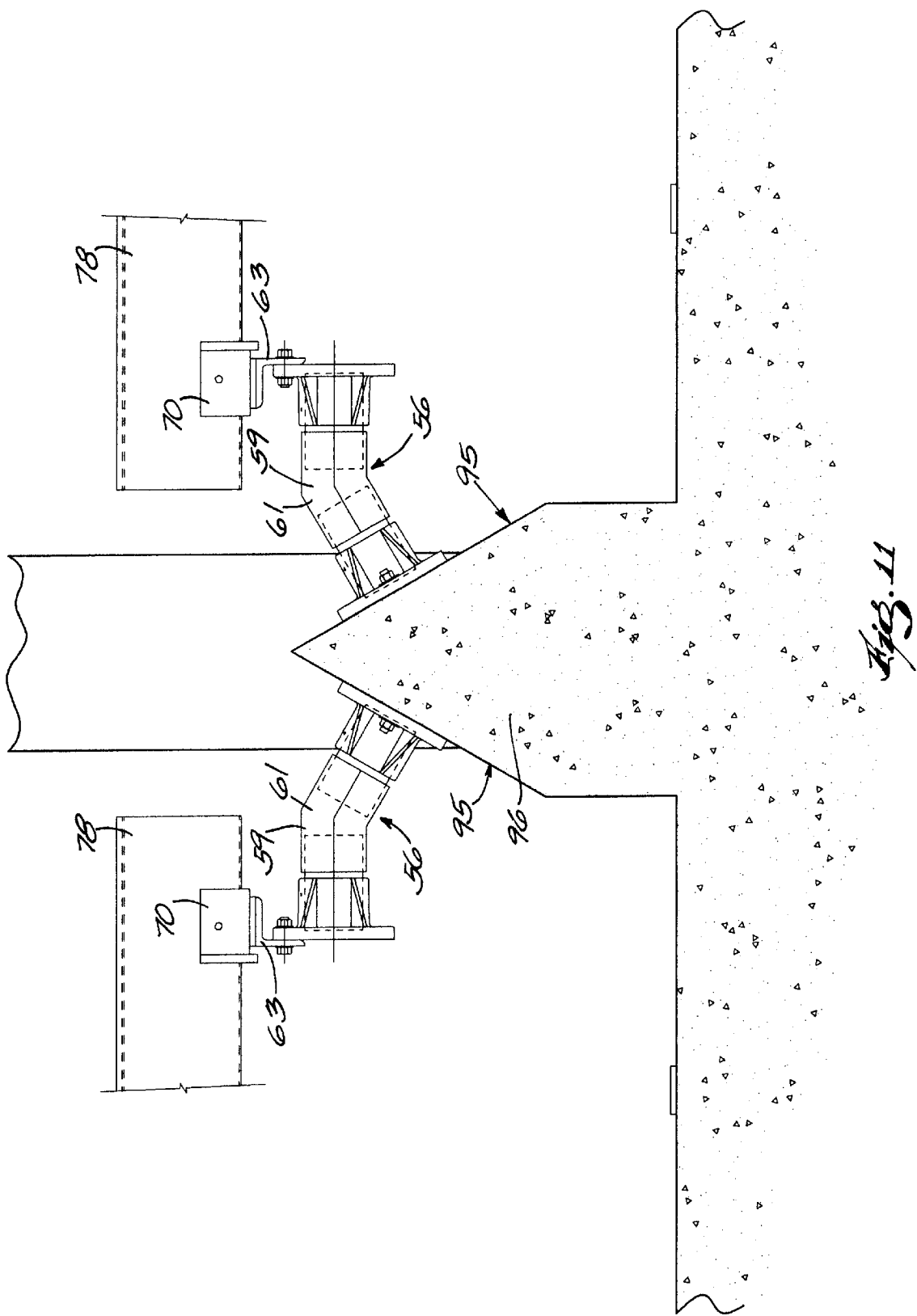
FIG. 11 is a side view of the bracket assembly of the present invention where the bracket assembly is connected to a lower interior wall of a wastewater treatment tank.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

There is shown in FIGS. 1 and 2 a mounting bracket 10 of the present invention. The mounting bracket 10 includes a hub 12 and a flange 14 that is connected to one end 16 of the hub 12. The hub 12 includes a longitudinal axis 30 and the flange 14 includes a plurality of openings 20, 21, 22, 23, 24, 25, 26, 27 that surround an outer surface 13 on the hub 12. The openings 20L 27 extend through the flange 14 such that the longitudinal axis on each of the openings 20–27 is parallel to the longitudinal axis 30 of the hub 12. The flange 14 further includes a circular opening 28 that has a longitudinal axis which is aligned with the longitudinal axis 30 of the hub 12. The openings 20–28 are intended to house fasteners for securing the mounting bracket 10 to either a collector flight support track or a wall within a wastewater treatment tank.

The size, shape and location of the openings 20–28 are shown most clearly in FIG. 2. There are two circular openings 20, 24 positioned on opposite sides of the flange 14 along a line 29 that extends through the longitudinal axis 30 of the hub 12. The openings 20, 24 are spaced at equal distances from the longitudinal axis 30.

There are also two parallel slots 22, 26 positioned on opposites of the flange 14. The slots 22, 26 are located at equal distances from the longitudinal axis 30 of the hub 12 and each of the slots 22, 26 includes a major axis 31 that is perpendicular to a line 33 which extends through the longitudinal axis 30 of the hub 12. The line 33 is perpendicular to the line 29 and bisects the major axis 31 of each slot 22, 26 such that the ends 50, 51 of the parallel slots 22, 26 are equally distant from the longitudinal axis 30 of the hub 12.

There are two additional parallel slots 21, 25 positioned on opposite sides of the flange 14, however, these slots 21, 25 are different from the aforementioned slots 22, 26 in that the ends 52, 53 of the slots 21, 25 are different distances from the longitudinal axis 30 of the hub 12. One end 53 of each of the slots 21, 25 is positioned near a line 35 that (i) extends through the longitudinal axis 30 of the hub 12; and (ii) is positioned halfway between the line 29 and the line 33.

There are two more parallel slots 23, 27 which are similar to the aforementioned parallel slots 21, 25 in that the ends 54, 55 of the slots 23, 27 are different distances from the longitudinal axis 30 of the hub 12. One end 55 of each of the slots 23, 27 is positioned near a line 37 that (i) extends through the longitudinal axis 30 of the hub 12; (ii) is positioned approximately halfway between the line 29 and the line 33; and (iii) is substantially perpendicular to the line 35.

The mounting bracket 10 further includes ribs or triangular gussets 32 that extend from one end 16 of the hub 12 to the other end 34. The ribs 32 extend longitudinally from an edge 36 on the end 34 of the hub 12 to a position near an edge 38 on an outside surface 40 of the flange 14.

The outside surface 40 of the flange 14 is octagonal and four ribs or gussets 32 support the hub 12. In addition, the hub 12, flange 14 and ribs 32 are all integral with one another and made as a unitary molded component from glass reinforced polypropylene.

The flange 14 also includes a planar contact surface 42 (FIG. 1) that is adapted to engage either the wall of a treatment tank or a collector flight support track. The planar contact surface 42 includes several recesses 44 that extend inwardly from the planar contact surface 42 to facilitate molding the mounting bracket 10.

The hub 12 also includes a pair of openings 46. Each of the openings 46 is positioned on opposing sides of the hub 12. The openings 46 are adapted to receive set screws (not shown in FIGS. 1 and 2) or the like which are used to secure an article inside the hub 12.

Referring to FIGS. 3 and 4, a bracket assembly 56 secures a collector flight supporting track 60 within a wastewater treatment tank. The bracket assembly 56 includes a first hub 57 and a second hub 58 that are preferably identical to the hubs 12 shown in FIGS. 1 and 2.

The first hub 57 is connected to a surface 62 on a wall 64 of a treatment tank. The first hub 57 is secured to the wall 64 using a fastener 66 that extends through the center opening 28. It should be understood that the first hub 57 can be secured to the wall 64 using any of the openings 20–28 without departing from the scope of the present invention (see, e.g., the fasteners 93, 94 in FIG. 7).

The second hub 58 is secured to a collector flight supporting track 60 that provides support to collector flights 78 that are circulating within the treatment tank. During operation of the treatment tank the collector flight supporting tracks 60 engage wear shoes 70 that are mounted on lower edges 74 and upper edges 76 of the collector flights 78.

The tracks 60 are secured to the second hub 58 using fasteners 67, 68 that extend through the slots 21, 27 in the flange 14 of the second hub 54. The configuration of the slots 21, 27 permits the track 60 to be adjusted as the track 60 is connected to the bracket assembly 56.

The first hub 57 is connected to the second hub 58 by a tube 59. The tube 59 is easily cut to an appropriate length so that the collector flight supporting track 60 is readily aligned with the wear shoes 70 on the collector flight 78. The ability to adjust the length that the bracket assembly 56 extends into the tank permits the bracket assembly 56 to be readily used to support collector flights 78 of different lengths. Once the tube 59 is inserted into the first hub 57 and the second hub 58, the tube 59 is secured in place using set screws 71, 72 that extend through the openings 46 on opposing sides of the first hub 57 and the second hub 58.

Referring to FIGS. 5 and 6, the bracket assembly 56 is shown securing an L-shaped collector flight support track 63 to the sidewall 64 of the wastewater treatment tank. Fasteners 73, 75 extend through the slots 21, 27 in the second hub in order to secure the L-shaped support track 63 to the second hub 58.

Referring to FIGS. 7 and 8, the bracket assembly 56 is shown securing a J-type collector flight support track 65 that is commonly used in a wastewater treatment industry to the sidewall 64 of the wastewater treatment tank. The J-type track 65 includes a projection 79 that is secured between an insert 80 and the second hub 58 of the bracket assembly 56. The insert 80, projection 79 and second hub 58 are secured together using fasteners 83, 84 that extend through the slots 21, 27 in the second hub 58.

The insert 80 is shown in greater detail in FIGS. 9 and 10. The insert 80 includes stepped openings 87, 88 that are adapted to receive a head of a fastener therein. The insert 80 further includes stepped edges 89 that are inserted into the J-type track 65 between the projection 79 and an end 77 of J-section (see FIG. 7). The recessed stepped edges 89 extend along opposing sides of the insert 80 such that the insert 80 may be mounted within the J-type track 65 in alternate orientations.

The J-type track 65 further includes a low friction wear pad 90 that is mounted on an upper arm 91 of the J-type track 65. The wear pad 90 is adapted to engage corresponding wear shoes 70 on the collector flight 78.

Referring to FIG. 11, a pair of bracket assemblies 56 are attached to opposing angled surfaces 95 on a lower interior wall 96 of the collector tank. The tube 59 includes an angled section 61 that permits the upper surface of the L-shaped collector flight support tracks 63 to be oriented horizontally once the bracket assembly 56 is installed. It is important that the upper surface of the L-shaped collector flight support track 63 is horizontal because the upper surface engages corresponding horizontal surfaces on the wear shoes 70 which are attached to the collector flights 78.

We claim:

1. A wastewater treatment system comprising:
    a tank for holding wastewater, said tank having a surface;
    a collector flight supporting track; and
    a bracket assembly for supporting said collector flight supporting track within the wastewater treatment tank, said bracket assembly including a first hub for connecting said bracket assembly to said surface, said first hub being attached to said surface, a second hub for connecting said bracket assembly to said collector flight supporting track, said second hub being connected to said collector flight supporting track for supporting said collector flight supporting track, and a member connecting said first hub to said second hub.

2. A wastewater treatment system as set forth in claim 1, wherein said member is a tube.

3. A wastewater treatment system as set forth in claim 2, wherein said tube is inserted into said first hub.

4. A wastewater treatment system as set forth in claim 3, wherein said tube is inserted into said second hub.

5. A method of securing a collector flight supporting assembly within a wastewater treatment tank, the method comprising:

providing a wastewater treatment tank including a surface and a collector flight supporting track;

attaching a first hub to the surface;

attaching a member to the first hub;

adjusting the length of the member to permit the supporting assembly to be used with a particular collector flight;

attaching a second hub to the member; and attaching the collector flight supporting track to the second hub.

6. The method as set forth in claim 5, wherein the member is a tube and adjusting the length of the tube includes cutting the tube to a particular length.

7. The method as set forth in claim 5, wherein attaching the member to the first hub includes inserting the member into a bore in the first hub.

8. The method as set forth in claim 5, wherein attaching the second hub to the member includes inserting the member into a bore in the second hub.

9. A wastewater treatment system comprising:

a tank for holding wastewater, said tank having a wall;

a collector flight supporting track; and a bracket assembly for securing said collector flight supporting track within the wastewater treatment tank, said bracket assembly including a first hub, a first flange extending outwardly from said first hub, wherein said first flange includes a plurality of openings extending through said first flange, and wherein said first flange is connected to one of said wall and said collector flight supporting track by fasteners extended through said openings, a second hub, a second flange extending outwardly from said second hub, wherein said second flange is connected to the other of said wall and said collector flight supporting track, and a member connecting said first hub to said second hub.

10. The wastewater treatment system as set forth in claim 9, wherein said first hub includes a longitudinal axis and each of said openings includes a longitudinal axis that is parallel to said longitudinal axis of said first hub.

11. The wastewater treatment system as set forth in claim 9, wherein said openings surround said first hub.

12. The wastewater treatment system as set forth in claim 11, wherein said first hub includes a longitudinal axis and said first flange includes an additional opening having a longitudinal axis that is aligned with said longitudinal axis of said first hub.

13. The wastewater treatment system as set forth in claim 9, wherein at least two of the openings are slots.

14. The wastewater treatment system as set forth in claim 13, wherein said first hub includes a longitudinal axis and each of said slots includes a major axis that is perpendicular to said longitudinal axis of said first hub.

15. The wastewater treatment system as set forth in claim 13, wherein at least two of said slots are parallel to one another.

16. The wastewater treatment system as set forth in claim 15, wherein each of said parallel slots include ends that are the same distance from said longitudinal axis of said first hub.

17. The wastewater treatment system as set forth in claim 15, wherein each of said parallel slots include ends that are different distances from said longitudinal axis of said first hub.

18. The wastewater treatment system as set forth in claim 9, wherein said first flange extends outwardly from an end of said first hub.

19. The wastewater treatment system as set forth in claim 18, wherein said first flange includes a planar surface adapted to engage either said wall or said collector flight support track.

20. The wastewater treatment system as set forth in claim 18 further comprising at least one rib extending along an outer surface of said first hub.

21. The wastewater treatment system as set forth in claim 20, wherein said rib extends from said first flange at one end of said first hub to an opposite end of said first hub.

22. The wastewater treatment system as set forth in claim 21, wherein said rib extends from the outer edge of said first flange to an outer edge on the opposite end of said first hub.

23. The wastewater treatment system as set forth in claim 22, wherein said first flange extends parallel to the longitudinal axis of said first hub.

24. The wastewater treatment system as set forth in claim 9, wherein said first hub is integral with said first flange.

25. The wastewater treatment system as set forth in claim 24, wherein the bracket is a unitary molded component.

* * * * *